July 6, 1965   G. L. CRONKRIGHT   3,193,038
SKI TOW DEVICE

Filed May 28, 1962   3 Sheets-Sheet 1

INVENTOR.
GRANT L. CRONKRIGHT
BY William L. Fisher
HIS ATTORNEY

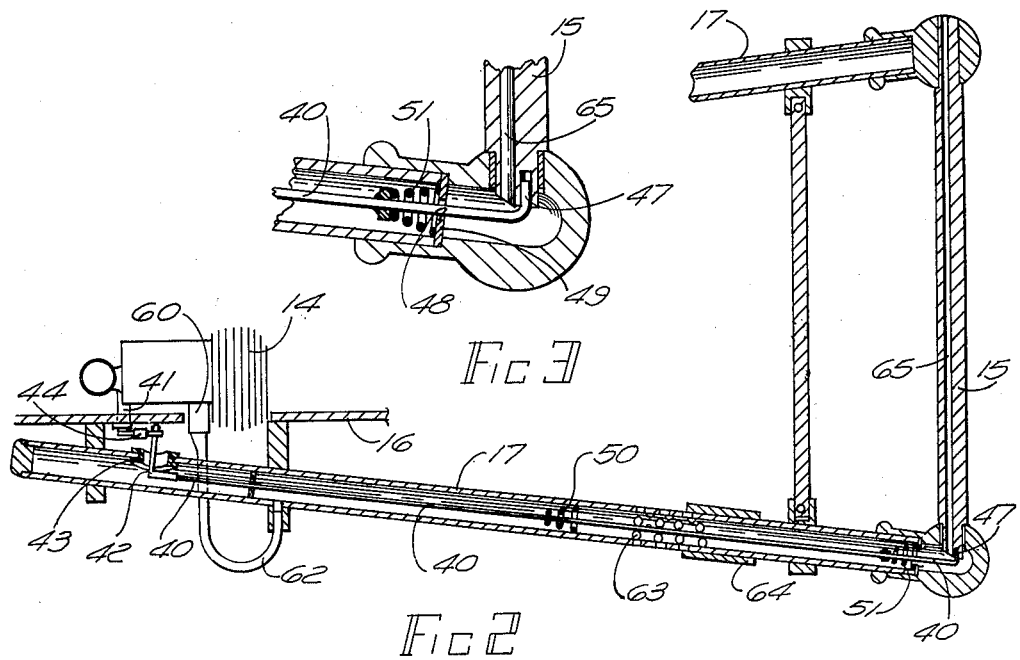
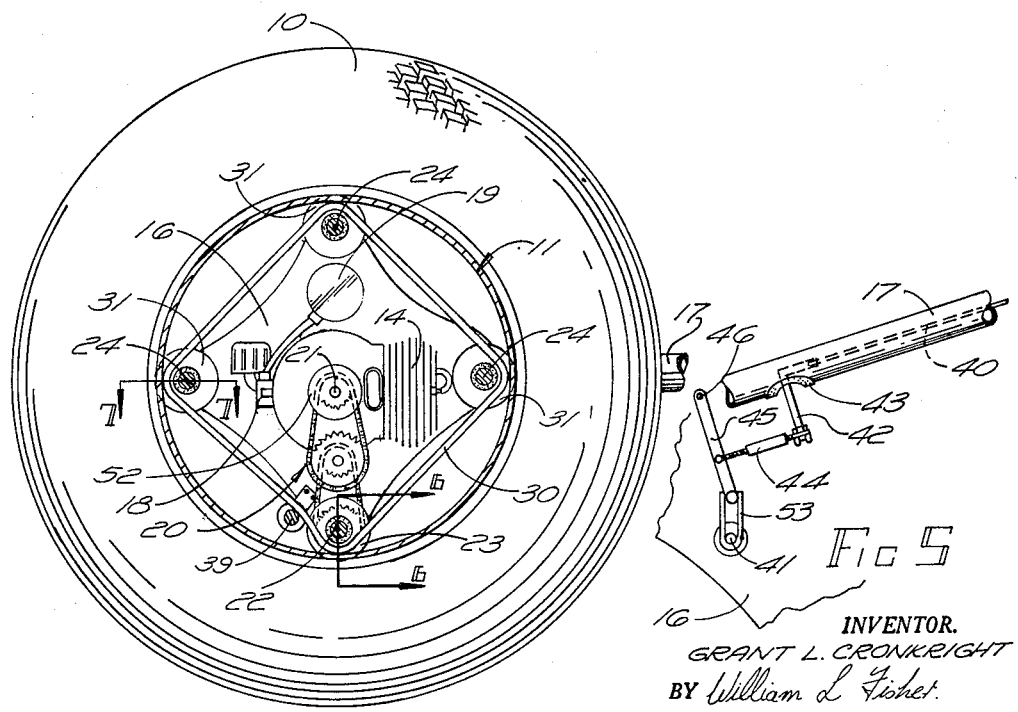

July 6, 1965  G. L. CRONKRIGHT  3,193,038
SKI TOW DEVICE
Filed May 28, 1962  3 Sheets-Sheet 3

INVENTOR.
GRANT L. CRONKRIGHT
BY William L. Fisher
HIS ATTORNEY

United States Patent Office 3,193,038
Patented July 6, 1965

3,193,038
SKI TOW DEVICE
Grant L. Cronkright, Macomb County, Mich.
(35093 Hengesbach, Mount Clemens, Mich.)
Filed May 28, 1962, Ser. No. 198,276
5 Claims. (Cl. 180—10)

This invention relates to improvements in hand-guided gasoline engine-operated wheeled devices and more particularly to a novel mono-wheeled ski tow device.

Its features and advantages will appear from the following description taken in conjunction with the accompanying drawings in which:

FIG. 2 is a plan view in section of the accelerator mechanism and exhaust system of said device;

FIG. 3 is an enlarged sectional view of a portion of the structure of FIG. 2;

FIG. 4 is a side elevational view of the drive mechanism of said device;

FIG. 5 is a side elevational view of a portion of the accelerator mechanism of said device;

Figure 1:
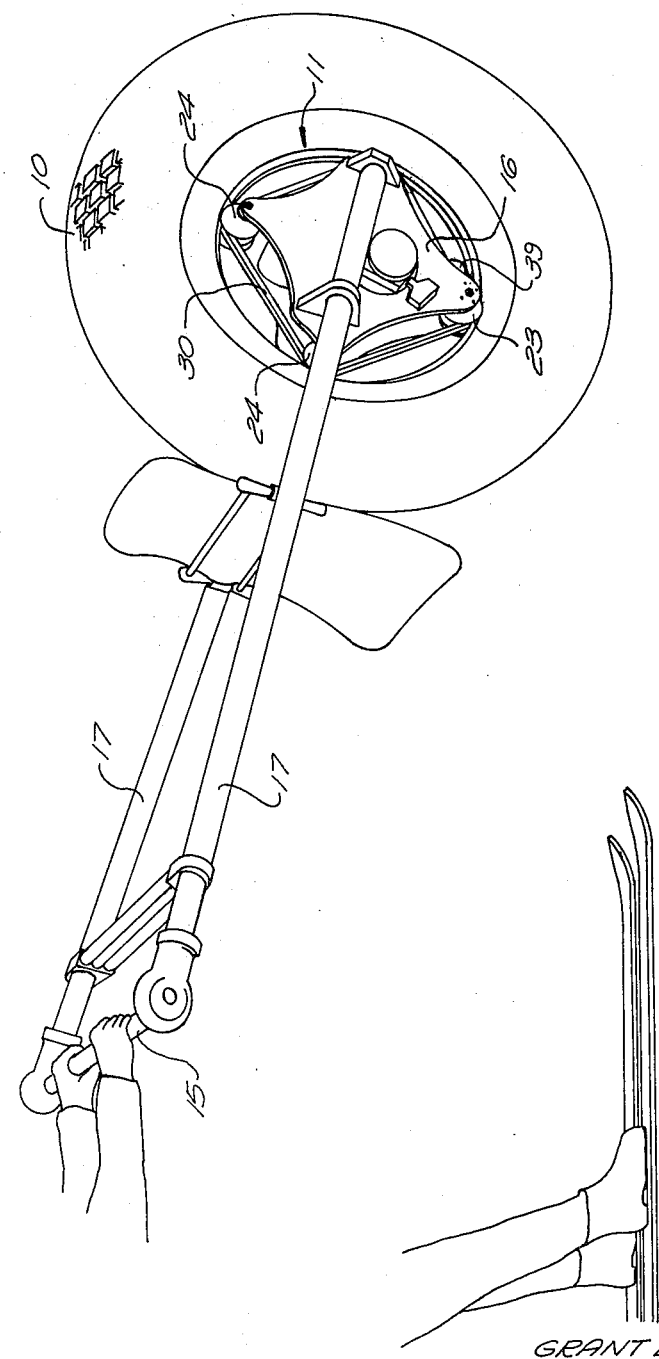
FIG. 1 is a perspective view of a ski tow device embodying the present invention.
Figure 6:
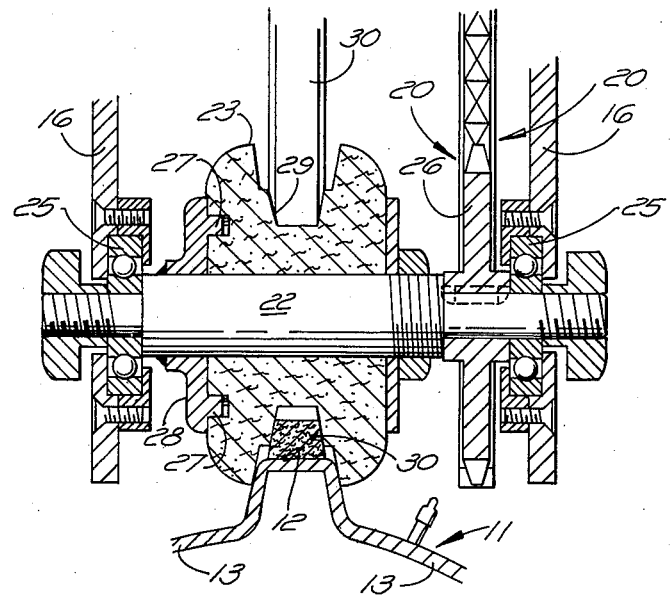
Figure 7:
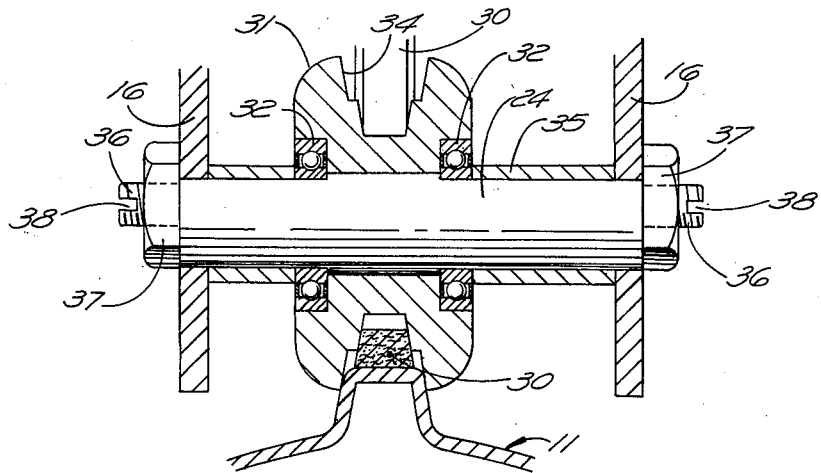

FIGS. 6 and 7 are sectional views along the lines 6—6 and 7—7, respectively, of the structure of FIG. 4.

The self-propelled mono-wheeled ski tow device embodying the invention comprises a tire 10 and a rim 11 of the structure shown in FIGS. 6 and 7 which includes an inner friction surface 12 and flanges 13 for engaging the bead of the tire 10.

A gasoline engine 14 is mounted between a pair of plates 16 to the outside of which are secured a pair of handle posts 17 that project away from the tire 10 and carry a tow bar handle 15 adapted to be gripped by a skier or by a pair of skiers side by side. The engine 14 is equipped with a diaphragm carburetor 18 fed from a fuel source 19 so that the device can be operated with the handle 15 on opposite sides of the tire 10 to either push or pull the skier or the pair of skiers.

The driving connection between the rim 11 and the engine 14 includes a chain and sprocket train 20 as shown between the output shaft 21 of the engine and a shaft 22 for a power wheel 23 which is thus power driven by the engine. The shaft 22 is rotatably mounted between the plates 16 by means of a pair of ball bearing races 25 which are fixed as shown in FIG. 5 to the inside of the plates 16. The sprocket 26 of the train 20 is keyed as shown to the shaft 22 and the power wheel 23 is keyed as shown as at 27 to a member 28 which is fixed fast to the same shaft. The wheel 23 has a central cut-away portion 29 for reception of an endless V-belt 30 which is power driven by the wheel 23 against the rim 11. The driving connection also includes three free-wheeling wheels 31 which are circumferentialy spaced at 90 degrees from each other and from the power wheel 23. Each wheel 31 is rotatably mounted as shown in FIG. 7 by a pair of ball-bearing races 32 between the plates 16 on a shaft 24 and has a cut-away portion 34 by which it is driven by the belt 30 which in turn is retained against the rim 11 by the wheel so that the rim is power driven by the belt at circumferentially spaced locations corresponding to the four wheels. The means for mounting each wheel 31 includes a pair of sleeves 35 between the plates 16 and the wheel 31. An eccentric construction as shown in FIG. 7 is provided for the opposite ends 36 of the shaft 24 to which are threadably engaged nuts 37 bearing against plates 16 so that the shaft 24 after being loosened may be rotated by slots 38 into adjustable positions which may then be fixed by tightening the nuts 37. By means of the ends 36 these variable positions are radial for the wheel 31 and hence vary the pressure which it exerts upon the belt 30 to retain it agains the rim 11. An idler wheel 39 which is adjustably spring biased with respect to the plates 16 is provided for adjusting the tension on the belt 30. The driving connection just described is simple but superior in the positive forces it applies to drive the tire over terrain such as snow or sand and in operation produces a motor reaction which must be counteracted by the operator who has the leverage in the handle posts to do this.

The tow bar handle 15 is rotatably mounted between the posts 17 as shown in FIGS. 2 and 3 and longitudinally moveable within the interior of one of the posts is a throttle linkage 40 which is operative to rotate a shaft 41 attached to the carburetor butterfly to increase and decrease the speed of the engine. The lower end of the linkage 40 is bent as at 42 and projects out of a grommet 43 in the handle post 17 as shown to connect to a turnbuckle link 44 which is affixed to a multiplier link 45. The link 45 is pivotally attached as at 46 to one of the plates 16 and its free end operates in free connector link 53 which is affixed to and rotates the shaft 41 upon linear movement of the linkage 40. The connection 47 between the handle 15 and the upper end of the linkage 40 is eccentric with respect to the rotation axis of the handle so that rotation thereof by the operator moves the linkage 40 linearly and causes the engine to accelerate when the linkage is moved up the handle post and to decelerate when it is moved down the post. The linkage 40 operates through an opening 48 in a plate 49 which provides for the combined linear and rotational movement of its end forming part of the connection 47. The opening 48 is thus enlarged and passes exhaust gases being conveyed through the handle post 17 as will be described. A centering spring 50 is secured in the post handle below the plate 49 to maintain the linkage free of the inside walls of the post. Yieldable means in the form of a compression spring 51 in the instance operates between the plate 49 and the linkage 40 to urge the latter down the post to decelerate the engine upon release of the handle by the operator. A centrifugal clutch 52 (FIG. 4) disengages the power from the engine upon its deceleration when the handle is released.

Means are provided to warm the handle by utilizing the heat of the exhaust gases which leave the exhaust port 60 of the engine 14 and includes a conduit 62 which conveys the exhaust gases from the port 60 to the interior of the handle post in which a plurality of openings are provided at 63 upwardly of the connection with the conduit 62 a sufficient distance to muffle the noise of the exhaust gases in discharging from the engine. A sleeve 64 is provided in a slidable position on the outside of the handle so that it may be moved over the openings 63 to vary the amount of the exhaust gases passing up the handle post 17 to the handle 15. When the sleeve is in its uncovered position shown, most all the exhaust gases pass out of the openings 63.

The handle 15 has a passageway 65 extending throughout its length to that one end of it communicates with the interior of the one handle post 17 as shown by which the exhaust gases pass through it to warm it and are discharged from its opposite end.

It will thus be seen that there has been provided by the present invention a mono-wheeled ski tow device in which the advantages hereinabove set forth together with other practical advantages have been successfully achieved. While a preferred embodiment of the invention has been shown and described it is to be understood that modifications, variations and changes may be resorted to without departing from the spirit of the invention as set forth in the appended claims.

What is claimed is:

1. A mono-wheeled ski tow device comprising tire means, a rim secured to the inside of the tire means, means for mounting a gasoline engine inside of the rim, and a driving connection between said engine and the rim to rotatably drive the tire means comprising an endless belt power driving the rim, and a power wheel powered by said engine and power driving the belt against the rim.

2. Apparatus as claimed in claim 1 including a free-wheeling wheel circumferentially spaced from the power wheel, the free-wheeling wheel driven by the belt and retaining the latter against the rim so that the belt power drives the rim at circumferentially spaced locations corresponding to the two wheels.

3. Apparatus as claimed in claim 2 including means for mounting the free-wheeling wheel so that its radial position is adjustable to vary the pressure by which it retains the belt at its location against the rim.

4. Apparatus as claimed in claim 3 including two other free-wheeling wheels and in which all the wheels are circumferentially spaced at 90 degrees from each other.

5. Apparatus as claimed in claim 1 having a tow bar handle secured to the engine mount and projecting away from the tire means so that it can be gripped by a skier, the device constructed to operate with the handle on opposite sides of the tire means so as to either push or pull the skier.

References Cited by the Examiner
UNITED STATES PATENTS

| | | | |
|---|---|---|---|
| 1,114,441 | 10/14 | Brix | 74—488 |
| 1,394,328 | 10/21 | Miller. | |
| 1,419,555 | 6/22 | Garwood | 305—7 |
| 1,983,907 | 12/34 | Lindner | 237—12.3 |
| 2,251,370 | 8/41 | Motzer | 237—12.3 |
| 2,345,496 | 3/44 | Opheim | 180—9.22 |
| 2,670,052 | 2/54 | Craver | 180—10 |
| 2,746,555 | 5/56 | Dalrymple | 180—10 |
| 2,776,579 | 1/57 | Nichel | 74—488 |
| 2,788,676 | 4/57 | Spexarth | 74—489 |

FOREIGN PATENTS

| | | |
|---|---|---|
| 11,719 | 1903 | Great Britain. |
| 1,169,880 | 9/58 | France. |

BENJAMIN HERSH, *Primary Examiner*

LEO FRIAGLIA, PHILIP ARNOLD, *Examiners.*